United States Patent
Luettgen et al.

(10) Patent No.: US 7,530,702 B2
(45) Date of Patent: May 12, 2009

(54) DISPLAY OVER GAGE INSTRUMENT CLUSTER

(75) Inventors: Michael J. Luettgen, Bloomfield Hills, MI (US); Paul F. L. Weindorf, Novi, MI (US); Brian C. Schweitzer, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 167 days.

(21) Appl. No.: 11/433,002

(22) Filed: May 12, 2006

(65) Prior Publication Data

US 2007/0263374 A1 Nov. 15, 2007

(51) Int. Cl.
*G01D 11/28* (2006.01)

(52) U.S. Cl. .............................. 362/23; 362/27; 362/28; 362/459; 362/471; 362/800; 362/545; 362/561

(58) Field of Classification Search .................. 362/23, 362/27, 28, 459, 471, 489, 488, 545, 800, 362/561
See application file for complete search history.

(56) References Cited

U.S. PATENT DOCUMENTS

| | | | | |
|---|---|---|---|---|
| 4,551,790 | A | * | 11/1985 | Benquey et al. ............... 362/23 |
| 4,862,395 | A | | 8/1989 | Fey et al. |
| 5,406,303 | A | | 4/1995 | Salmon et al. |
| 5,430,612 | A | | 7/1995 | Simon et al. |
| 5,469,137 | A | | 11/1995 | Muto |
| 5,652,508 | A | | 7/1997 | Yamamoto |
| 5,702,179 | A | * | 12/1997 | Sidwell et al. .............. 362/255 |
| 6,060,985 | A | | 5/2000 | Siviero |
| 6,120,159 | A | | 9/2000 | Inoguchi et al. |
| 6,226,588 | B1 | | 5/2001 | Teramura et al. |
| 6,281,788 | B1 | | 8/2001 | Noll |
| 6,379,015 | B2 | * | 4/2002 | Wilhelm et al. ............... 362/23 |
| 6,409,355 | B1 | * | 6/2002 | Simon et al. .................. 362/23 |
| 6,508,563 | B2 | * | 1/2003 | Parker et al. .................. 362/29 |
| 6,522,381 | B1 | | 2/2003 | Brandt |
| 6,600,427 | B2 | | 7/2003 | Simon et al. |
| 6,817,310 | B2 | | 11/2004 | Sugiyama et al. |
| 6,857,767 | B2 | | 2/2005 | Matsui et al. |
| 2004/0046713 | A1 | | 3/2004 | Tanaka et al. |
| 2005/0063194 | A1 | | 3/2005 | Lys et al. |

(Continued)

FOREIGN PATENT DOCUMENTS

JP 54153443 12/1979

*Primary Examiner*—Sandra L O'Shea
*Assistant Examiner*—Jessica L McMillan
(74) *Attorney, Agent, or Firm*—Brinks Hofer Gilson & Lione

(57) ABSTRACT

A motor vehicle instrument cluster comprising an analog indicator assembly having a pointer rotatably coupled to an actuator for a movement by the actuator, and a display assembly including a display screen for displaying information to an occupant of the motor vehicle and a printed circuit board electrically connected to the indicator assembly and the display assembly. In addition, the printed circuit board is electrically connected to an electrical ground and a metal support frame is mounted to the printed circuit board and coupled thereby to the electrical ground. The metal frame includes a support tray spaced apart from the printed circuit board, defining a gap in between. Finally, the display assembly is mounted in thermal communication to the support tray and the frame and the printed circuit board cooperate to define a static discharge path between the display assembly and the electrical ground.

13 Claims, 2 Drawing Sheets

U.S. PATENT DOCUMENTS

| | | |
|---|---|---|
| 2005/0078485 A1* | 4/2005 | Kraus et al. .................. 362/489 |
| 2005/0212669 A1 | 9/2005 | Ono et al. |
| 2006/0012971 A1* | 1/2006 | Fong et al. .................... 362/23 |

* cited by examiner

DISPLAY OVER GAGE INSTRUMENT CLUSTER

BACKGROUND

1. Field of the Invention

The present invention generally relates to automotive instrument clusters. More specifically, the invention relates to instrument clusters where a display is located in front of an analog gage while allowing the analog pointer to remain visible.

2. Description of Related Art

Originally, automobile instruments were analog devices. Using mechanical or electro-mechanical means, they displayed the operational status and performance of a motor vehicle. However, only factors that could be directly measured could be displayed to the driver. Common gages of this type are speedometers, tachometers, odometers, fuel level, oil pressure and the like. Each of these analog gages are connected to a sensor providing a signal in direct proportion to the value being measured.

As technology has advanced, analog gages and sensors have been replaced by digital sensors and gages. A digital instrument panel, rather than being connected directly to the sensors monitoring the performance of the vehicle, is connected to a digital controller that is connected to the sensors. The controller then monitors the output of the sensors, processes the information, and displays the information on the instrument panel to display in a manner useful to the driver.

Various types of digital indicators may be used. Numeric digital displays have been used where, for example, the speed of the vehicle was displayed in an alpha-numeric lighted display. Other indicators included LCD's for the display of secondary information, such as mileage or oil pressure.

Some information is more readily interpreted using a digital display. For example, rather than lighting a generic "check engine" light when a problem is detected by the controller, a digital display allows the controller to display more detailed information, such as "change oil" or "low tire pressure." In addition, a single digital display can have multiple functions, thereby saving space. Finally, if a large color display used, it is possible for the controller to include a navigation system. Such a configuration may display navigational maps which, when incorporated with a global positioning system (GPS), can display the vehicle's location.

Despite the flexibility of digital indicators and displays, consumers have consistently preferred the behavior and appearance of traditional analog gages. These may be used in conjunction with a digital controller by attaching a pointer indicator to a small electric motor electrically coupled to the controller. The controller then commands the motor to move the pointer between numbers on a scale representing, for example, miles per hour, printed on the instrument panel.

One drawback of large digital displays is that they occupy a significant amount of area. Therefore, if an LCD, for example, is included, some analog indicators may be omitted. As mentioned earlier, many consumers of motor vehicles prefer analog indicators to monitor certain parameters. Some of these indicators, such as speed, may be quite large. This limits the amount of space available for a large digital display, such as an LCD.

However, the center of a typical analog indicator has no significant function. The movement of the end of the pointer is what conveys the desired information to the driver. Thus, the center of an analog indicator provides space that may be used for other purposes. As a result, many instrument clusters use this location to install large LCD's, or other digital displays, while retaining the analog indicators and minimizing the space occupied on the instrument cluster.

However, in order to avoid having the LCD interfere with the analog gage, it is usually cantilevered in front of the pointer. This allows the pointer to move freely through its range of motion, but still allows the display to be positioned in the center of the gage.

A drawback to this configuration is that existing displays are cantilevered in front of the analog indicator using a simple, plastic frame. While plastic has the advantage of being a light weight, inexpensive material, it has a number of disadvantages. For example, plastic is a high dielectric material, has low stiffness, and has poor thermal conductivity.

Thus, plastic frames are an efficient supporter of electrostatic fields, which exacerbates the Tribo Electric Effect. The Tribo Electric Effect is where a static charge is allowed to build on the LCD and discolor the output of the display. In addition, such displays are relatively heavy, and the low stiffness of the plastic frame allows it deflect and vibrate as the vehicle moves. As a result, the display may interfere with the analog gage and this necessitates the provision of a large gap between the display and the gage to allow for deflection. As a result, the overall thickness of the instrument cluster is increased. Because of poor thermal conductivity, heat can build up and may limit the brightness of the display. This in turn may limit the current at which the display may be driven.

In view of the above, it is apparent that there exists a need for an improved display frame that overcomes the disadvantages and limitations of the known technology.

SUMMARY

In satisfying the above need, as well as overcoming the enumerated drawbacks and other limitations of the related art, the present invention provides a motor vehicle instrument cluster including an analog indicator assembly having a pointer rotatably coupled to an actuator for movement by the actuator and a display assembly including a display screen for displaying information to an occupant of the motor vehicle. A printed circuit board is electrically connected to the indicator assembly, the display assembly, and an electrical ground. A metal support frame is mounted to the printed circuit board and coupled thereby to the electrical ground. The frame includes a support tray spaced apart from the printed circuit board to define a gap between the tray and circuit board wherein the tray supports and is in thermal communication with the display assembly. In addition, the frame and the printed circuit board cooperate to define a static discharge path between the display assembly and the electrical ground. Finally, the metal frame is made from a rigid metal material and reduces the dynamic displacement of the display assembly when the vehicle is in motion. This also allows for a reduction in the amount of space required to prevent interference between the frame, cover and analog indicator.

Further objects, features and advantages of this invention will become readily apparent to persons skilled in the art after a review of the following description, with reference to the drawings and claims that are appended to and form a part of this specification.

DETAILED DESCRIPTION

Figure 1:
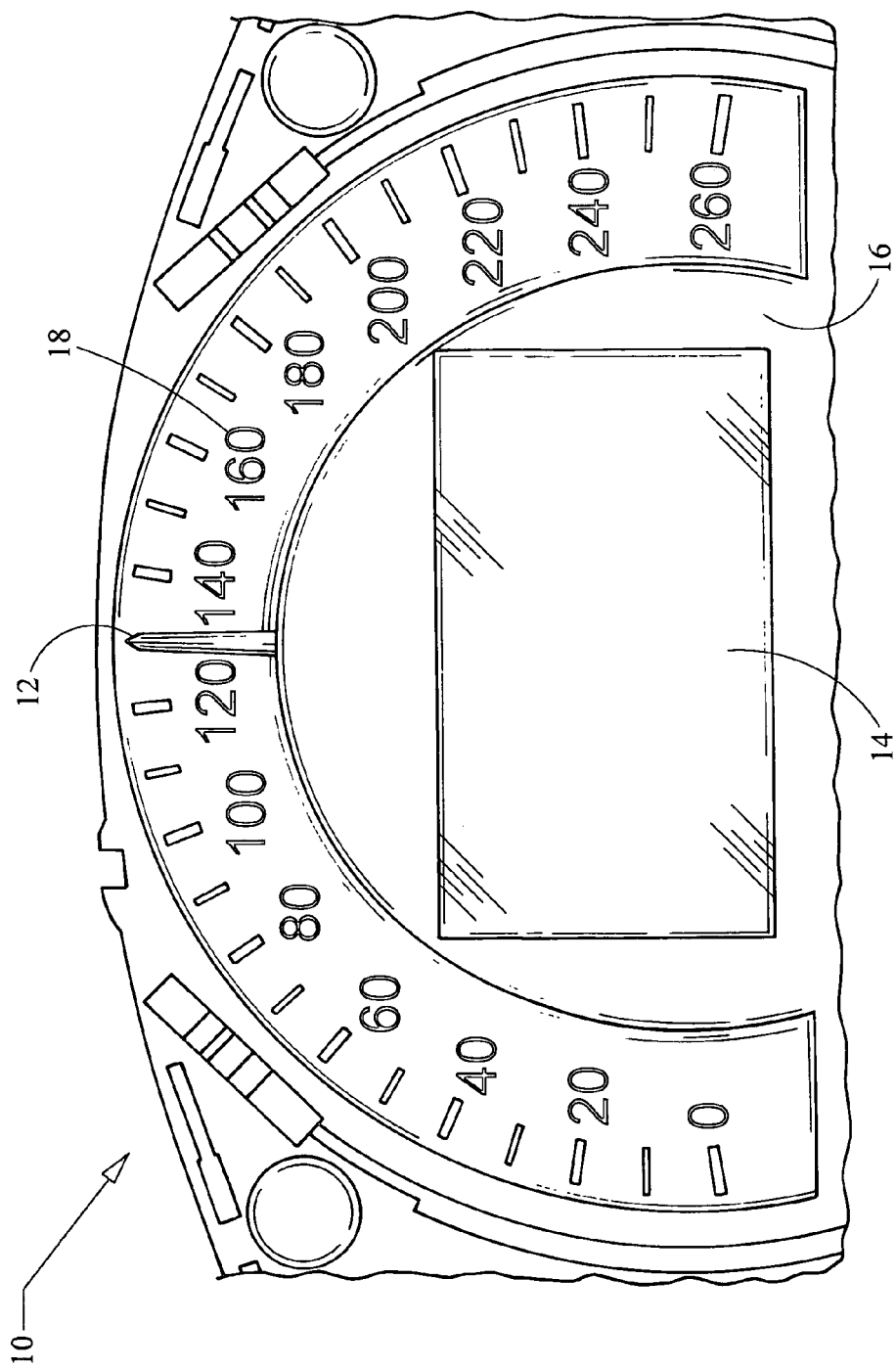
FIG. 1 is a partial front view of an assembled instrument cluster located in an instrument panel of a motor vehicle.

Referring now to the drawings, an instrument cluster embodying the principles of the present invention is illustrated in FIG. 1 and designated at 10. As its primary components, the instrument cluster 10 includes an analog pointer 12, a display assembly 14, and a face plate 16 having indicia 18 indicating, for example, vehicle speed. Additional features, shown in FIG. 2, include a frame 20 mechanically mounted and electrically coupled to a circuit board 22 and a motor 24, also mounted to the circuit board 22 and rotatably coupled to the pointer 12.

Looking more closely at the display assembly 14, it incorporates a flat panel display 26. The flat panel display 26 may be of any type capable of fitting within the instrument cluster 10, with typical examples including, but not limited to, liquid crystal displays (LCD), organic light-emitting diode (OLED) displays, and electrochromic displays. In some embodiments, such as that shown in FIG. 2, the flat panel display 26 may also require a backlight array 28. The backlight array 28 may be of any type known in the art capable of meeting the illumination needs of the particular flat panel display 26. They typically include light-emitting diodes (LED's) 34 or fluorescent bulbs. In either case, the purpose of the backlight array 28 is to illuminate the flat panel display 26 from behind, determining the brightness of the displayed image.

Figure 2:
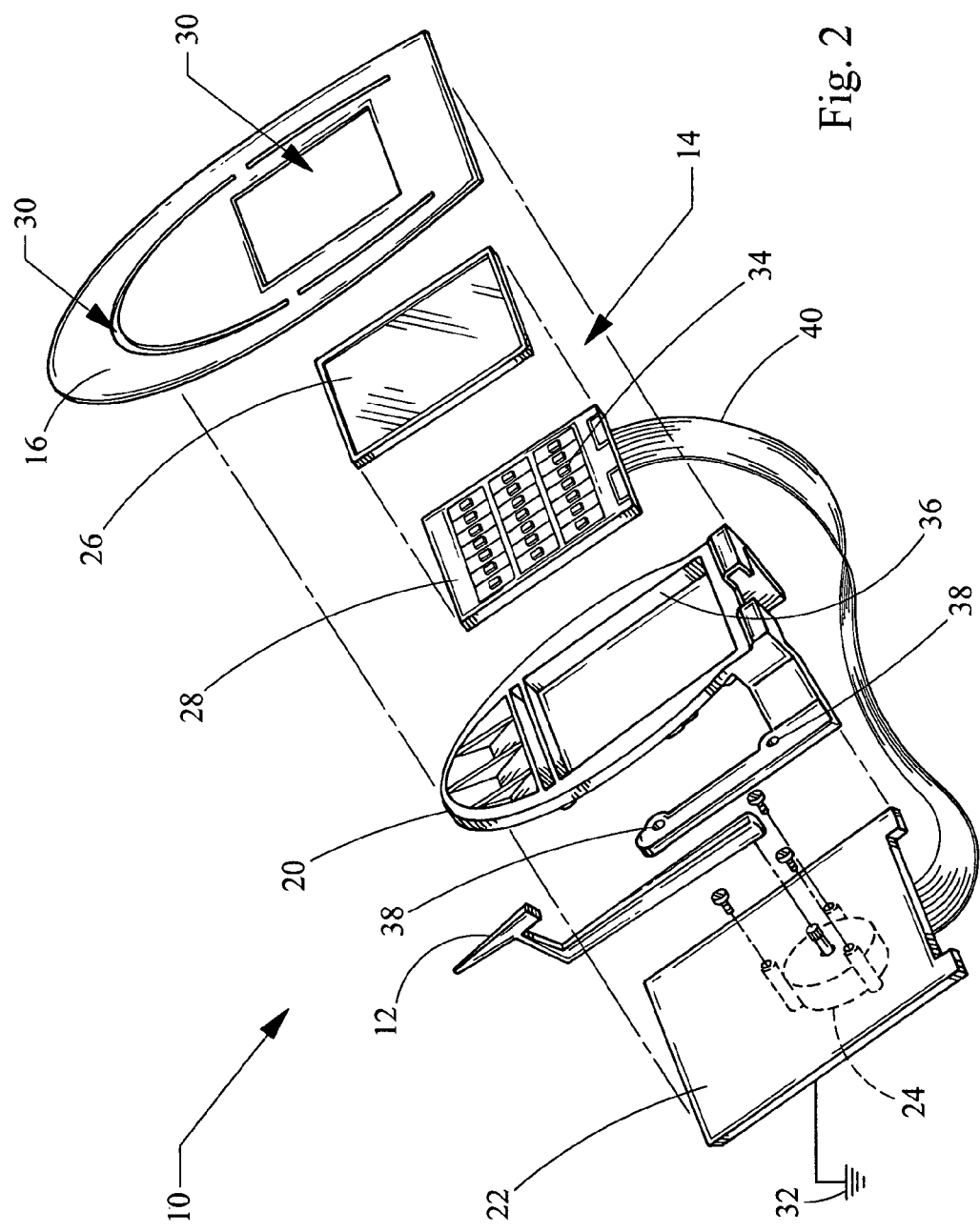
FIG. 2 is an exploded view of the instrument cluster seen in FIG. 1.

For example, the flat panel display 26 illustrated in FIG. 2 is of the LCD type. As a result, the backlight array 28 and it includes a plurality of LED's 34. In the example shown, twenty-one LED's 34 are provided but the exact number will vary. On the other hand, an OLED flat panel display 26 is self-illuminating and does not require a backlight array 28. In either case (with or without a backlight array 28) the display assembly 14 generates heat when operated. As the desired brightness increases, the amount of heat generated also increases.

The display assembly 14 is supported by and mechanically coupled to the frame 20. As shown in FIG. 2, a receptical 36 is configured to accept the display assembly 14 within the frame 20. Any conventional fastener may be used to secure the display assembly 14 within the receptical 36 including screws, hook and loop tape, adhesive tape, glue, clips, tabs or the like. Alternatively, the receptical 36 may be omitted and the display assembly 14 fastened directly to another surface of the frame 20. In addition, the display assembly 14 is electrically coupled to the frame 20 by, for example, metal screws or a wire fastened between the display assembly 14 and the frame 20. Finally, the display assembly 14 is thermally coupled to the frame 20 by maximizing the contact area between the two components 14 and 20. Heat transfer may also be enhanced by including a thermal compound, such as thermal paste or tape, between the display assembly 14 and the frame 20. The thermal compound fills in any imperfections or gaps between the two components 14 and 20 to increase heat transfer.

Furthermore, the frame 20 is mechanically and electrically coupled to the circuit board 22 and configured to cantilever the display assembly 14 in front of the pointer indicator 12. The frame 20 is made of a rigid metal including, but not limited to, magnesium, aluminum, steel, zinc and copper. It is coupled to the circuit board by a plurality of appropriate fasteners, for example metal screws or bolts inserted through holes 38 in the frame 20 into the circuit board 22. This may also bring the frame 20 into contact with conductive surfaces (not shown) of the circuit board 22. Alternatively, electrical contact may be provided by a conductive wire fastened to both the frame 20 and the circuit board 22 by any appropriate conductive means such as solders, screws or other electrical connection. The circuit board 22 and/or the frame 20 are then connected to a vehicle ground 32, defining a static discharge path.

To operate the display assembly 14, an electrical connection 40 including a plurality of wires is provided between the circuit board 22 and the display assembly 14. The wires are connected to the components 14 and 22 using any appropriate fastening means, such as soldering or a removable plug, and are configured to convey electrical signals from the circuit board 22 to the display assembly 14. The circuit board 22, via the electrical connection 40, controls and powers the display assembly 14.

Finally, the face plate 16 is mounted to the frame 20 such that the analog pointer 12 and the flat panel display 26 are visible through openings 30 in the plate 16. The face plate 16 may be mounted using any of the appropriate fasteners described above. Thus, only the indicia 18, the end of the analog pointer indicator 12 and the display panel 26 are visible when the unit is fully assembled (see FIG. 1). One of the openings 30 is arranged to allow the pointer indicator 12 to move along a path of motion relative to the indicia 18. When appropriately configured, the position of the pointer indicator 12 may signify, for example, the speed of the vehicle or the revolutions per minute (RPM) of a vehicle engine.

The above configuration has a number of significant advantages over prior art plastic frames. First, by electrically coupling the display assembly 14 to the frame 20, the circuit board 22 and the vehicle ground 32, a static discharge path is defined. This prevents the build-up of a static electric charge on the display panel 26, reducing or eliminating any distortion from the Tribo Electric Effect. Second, by making the frame 20 from a rigid metal, the dynamic displacement of the frame 20 and cantilevered display assembly 14, is greatly reduced, decreasing the space required to prevent interference between the frame 20, the analog pointer 12, and the cover 16. This allows more compact packaging of the instrument cluster 10.

Finally, since heat is a primary limiting factor in the brightness of the display assembly 14, the metal frame 20 acts as an efficient heat sink for the display assembly 14 because of its much greater thermal conductivity than the prior art plastic frames. In the present invention, this allows for increased brightness to be provided by driving the LED backlight array 28 at a higher current than would be possible with a plastic frame. Conversely, cost savings may be realized by using and driving fewer LED's 34 at a higher current to achieve an equivalent level of brightness. Similarly, a self-illuminating display, such as the earlier mentioned OLED display, may be driven at a higher current in the absence of the backlight array 28. The heat sinking properties of the metal frame 20 may, for example, allow 40% more light to be generated by the backlight array 28 than when using a plastic frame. Conversely, in the exemplary embodiment shown in FIG. 2, approximately 40% fewer LED's 34 may be provided to achieve the same level of brightness, all else being equal. As one skilled in the art will recognize, the numbers listed above are but one example. The exact amount of additional brightness that may be generated, or the number of LED's 34 in the backlight array 28 that may be omitted, may vary significantly depending on the components, arrangement and geometry of a particular embodiment.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A motor vehicle instrument cluster comprising:
   an analog indicator assembly having a pointer rotatably coupled to an actuator for a movement by the actuator;
   a display assembly including a display screen for displaying information to an occupant of the motor vehicle;
   a printed circuit board electrically connected to the indicator assembly and the display assembly, the printed circuit board also being electrically connected to an electrical ground;
   a metal support frame mounted to the printed circuit board and coupled thereby to the electrical ground, the frame including a support tray spaced apart from the printed circuit board to define a gap therebetween, the display assembly being mounted to the support tray and being in thermal and electrical communication therewith, the frame and the printed circuit board cooperating to define a static discharge path between the display assembly and the electrical ground.

2. The instrument cluster according to claim 1 wherein the display assembly includes a backlight array.

3. The instrument cluster according to claim 2 wherein the display screen is a liquid crystal display (LCD) panel.

4. The instrument cluster according to claim 2 wherein the backlight array comprises a plurality of light sources.

5. The instrument cluster according to claim 4 wherein the light sources are light-emitting diodes (LED's).

6. The instrument cluster according to claim 5 wherein the light sources are fluorescent bulbs.

7. The instrument cluster according to claim 1 wherein the display screen is an organic light-emitting diode (OLED) display.

8. The instrument cluster according to claim 1 wherein the frame is constructed of one selected from the group of magnesium, aluminum, steel, zinc, copper, bronze or alloys thereof.

9. The instrument cluster of claim 1 wherein the support tray includes a plurality of fins extending from a backside thereof, the backside being a side of the tray facing the printed circuit board and extending into the gap defined between the tray and the printed circuit board.

10. The instrument cluster of claim 1 further comprising a face plate having indicia formed thereon, said face plate including an aperture through which the display assembly is viewable.

11. The instrument cluster of claim 10 wherein the pointer extends through a second aperture formed in the face plate.

12. A motor vehicle instrument cluster comprising:
    an analog indicator assembly having a pointer rotatably coupled to an actuator for a movement by the actuator;
    a display assembly including a display screen for displaying information to an occupant of the motor vehicle;
    a printed circuit board electrically connected to the indicator assembly and the display assembly, the printed circuit board also being electrically connected to an electrical ground;
    a metal support frame mounted to the printed circuit board and coupled thereby to the electrical ground, the frame including a support tray spaced apart from the printed circuit board to define a gap therebetween, the display assembly being mounted to the support tray and being in thermal and electrical communication therewith, the frame and the printed circuit board cooperating to define a static discharge path between the display assembly and the electrical ground; and the support tray positioning the display assembly over a portion of the pointer of the indicator assembly so as to partially conceal the pointer from the occupant of the vehicle.

13. A motor vehicle instrument cluster comprising:
    an analog indicator assembly having a pointer rotatably coupled to an actuator for a movement by the actuator;
    a display assembly including a display screen for displaying information to an occupant of the motor vehicle;
    a printed circuit board electrically connected to the indicator assembly and the display assembly, the printed circuit board also being electrically connected to an electrical ground;
    a metal support frame mounted to the printed circuit board and coupled thereby to the electrical ground, the frame including a cantilevered support tray spaced apart from the printed circuit board to define a gap therebetween, the display assembly being mounted to the support tray and being in thermal and electrical communication therewith, the frame and the printed circuit board cooperating to define a static discharge path between the display assembly and the electrical ground.

* * * * *